June 13, 1933.  W. F. CLEAVER  1,913,371
ELECTRIC MAGNETIC GEAR
Filed May 4, 1929  4 Sheets-Sheet 1
FIG. 1.
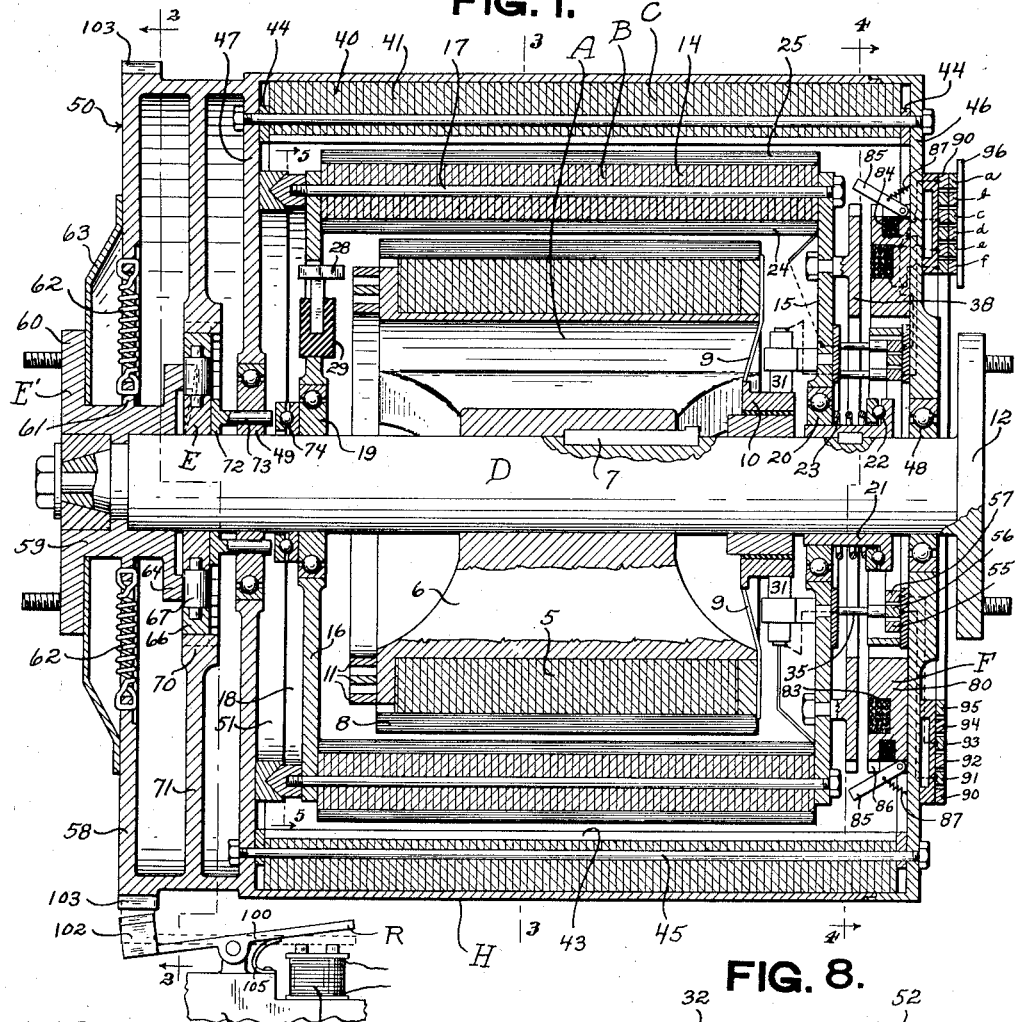
FIG. 6.
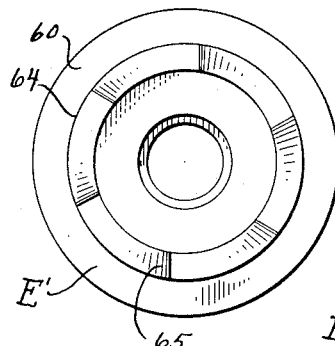
FIG. 7.
FIG. 8.
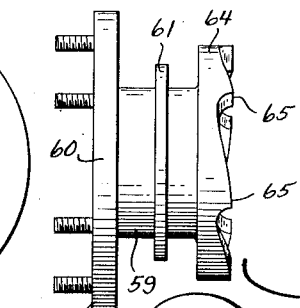
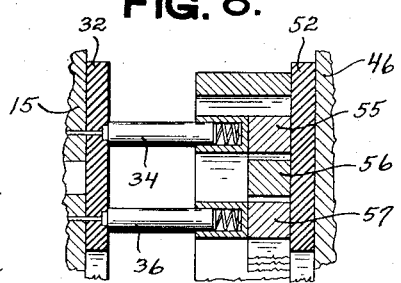
INVENTOR.
William F. Cleaver.
BY Lancaster and Allwine
ATTORNEYS.

June 13, 1933.  W. F. CLEAVER  1,913,371
ELECTRIC MAGNETIC GEAR
Filed May 4, 1929  4 Sheets-Sheet 2

INVENTOR.
William F. Cleaver.
BY
ATTORNEYS.

June 13, 1933.   W. F. CLEAVER   1,913,371
ELECTRIC MAGNETIC GEAR
Filed May 4, 1929   4 Sheets-Sheet 3

INVENTOR.
William F. Cleaver.
BY
ATTORNEYS.

June 13, 1933.    W. F. CLEAVER    1,913,371
ELECTRIC MAGNETIC GEAR
Filed May 4, 1929    4 Sheets-Sheet 4

INVENTOR.
William F. Cleaver.
BY Lancaster and Allwine
ATTORNEYS.

Patented June 13, 1933

1,913,371

UNITED STATES PATENT OFFICE

WILLIAM FREDERIC CLEAVER, OF MONTREAL, QUEBEC, CANADA

ELECTRIC MAGNETIC GEAR

Application filed May 4, 1929. Serial No. 360,554.

The present invention relates to power transmission apparatus, and the primary object of the invention resides in the provision of a device for converting speed revolutions per minute of force into variable power at any other number of revolutions per minute that may be desired, electromagnetically.

A further object of the invention is to provide an electric transmission device wherein the range of speed ratio between the drive and driven elements will be entirely automatic from the highest to the lowest.

A further object of the invention is to provide an electromagnetic gear device embodying concentrically arranged members having relative rotary movement and cooperatively functioning in sets as independent units one in the form of a generator and the other as a motor when the torque or turning strain on the gear exceeds a predetermined point.

A further object of the invention is to provide an electromagnetic gear device for motor vehicles, serving as power transmission means between the engine and drive shaft and allowing for the usual gear set, clutch, starter and generator to be dispensed with.

A further object of the invention is to provide an electromagnetic gear device embodying inner, intermediate and outer concentrically arranged members being relatively rotatable with respect to one another with the inner member having magnetic coupling with the intermediate member and with the intermediate member being normally mechanically connected with the outer member and mechanically free therefrom when the torque on the outer member exceeds a predetermined point, and after which the intermediate and outer members are magnetically connected.

Other objects and advantages of the invention will be apparent during the course of the following detailed description, taken in connection with the accompanying drawings forming a part of this specification and in which drawings:

Figure 1 is a central longitudinal section thru the improved electric magnetic gear and showing the elements thereof in their normal positions when the gear is inactive.

Figure 2 is a section on a reduced scale taken on the line 2—2 of Figure 1, and showing the yieldable connection between the outer member and a member acting to shift the intermediate member longitudinally out of mechanical connection with the outer member when the torque reaches a predetermined point. Figure 2 also shows the means for preventing circumferential but allowing axial movement of the thrust member imparting axial movement to the intermediate member.

Figure 6 is an end view of the hub member to which the outer member is yieldably coupled and which hub member acts to mechanically free the intermediate member when the turning strain on the outer member exceeds a given point.

Figure 7 is a side elevation of the hub member.

Figure 8 is an enlarged fragmentary detail section showing the contact brushes forming a bridge between the outer and intermediate members and allowing axial movement of the intermediate member.

Figure 2:
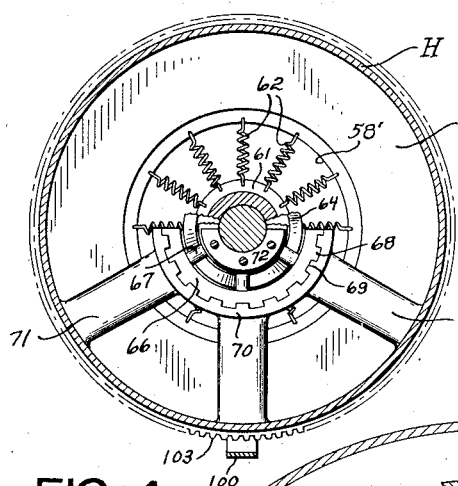
Figure 3:
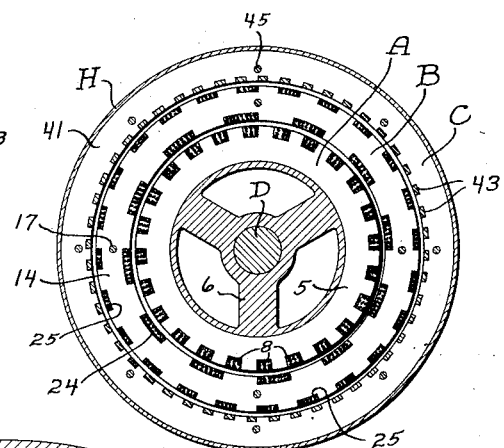
Figure 3 is a section on a reduced scale on line 3—3 of Figure 1.

While hereinafter set forth in the specification and as illustrated in the accompanying drawings, the device has been disclosed as an electro-magnetic gear device especially well adapted for use upon motor vehicles, it will be apparent that the device will find ready application to various other uses of power transmission apparatus wherein a variable speed ratio is desired between the source of power and driven element.

Referring to the drawings in detail, and wherein similar reference characters designate corresponding parts thruout the several views, the improved magnetic gear device embodies an inner unit A, an intermediate unit B, and an outer unit C, mounted for relative rotary movement upon a common supporting or mounting shaft D. E designates torque controlled thrust means for automatically freeing mechanical coupling between the intermediate unit B and outer unit C, when the turning strain is raised above a given point, and including a coupling member E' freely mounted upon the shaft D and having circumferentially yieldable connection with the outer unit C. F designates electro-magnetic means for electrically liberating the intermediate and outer unit and F' electromagnetic locking means for mechanically connecting the intermediate and outer units when the gear functions as a starter for cranking the engine.

The inner unit A is an armature embodying a laminated core 5 mounted upon a spider 6 keyed to the intermediate portion of the shaft D by a key 7. Arranged in suitable slots in the circumference of the core 5 are coil windings 8 which may be of any of the numerous types of windings, such as ring wound, lap wound, drum wound, or any of the other symmetrical types, suitably connected by leads 9 to the segments of a commutator 10 affixed to the shaft D at the forward end of the armature. Provided on the rear end of the armature or inner member A are three concentrically arranged slip rings 11 which are connected to the armature windings 8 at 120 electrical degrees apart. The unit or armature A will therefore, act, when revolved in a magnetic field, to produce a direct current electromotive force at the commutator 10 and an alternating current electromotive force at the slip rings 11.

The shaft D is provided at its forward end with a coupling flange 12 adapted to be connected to the source of power and as in the case of a motor vehicle, coupled directly to the engine crank shaft. Thus it will be seen that the armature or inner unit A is directly connected for rotation with the source of power.

Figure 5:
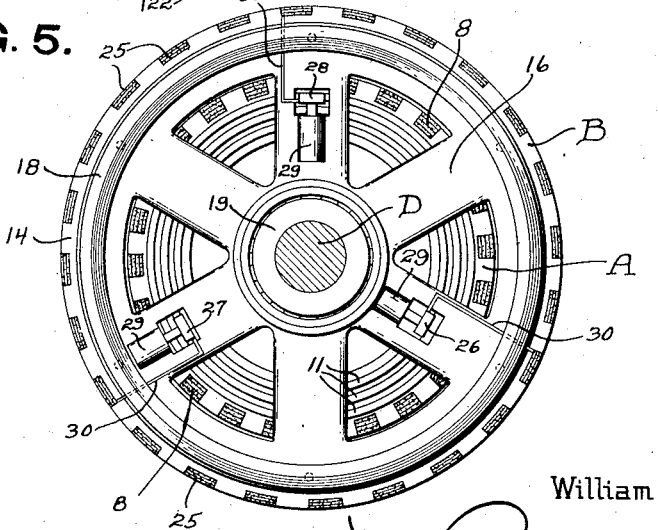
Figure 5 is a section taken substantially on the line 5—5 of Figure 1 and looking at the rear end of the intermediate member and showing the arrangement of brushes for contacting with the collector rings carried by the rear end of the inner member.
Figure 9:
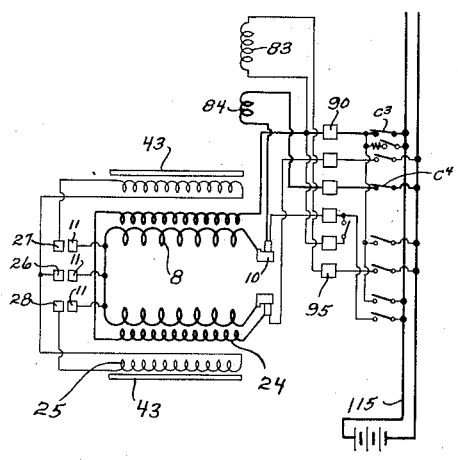
Figure 9 is a wiring diagram illustrating by heavy lines the active parts of the circuit when the device acts as a starter for the engine.

The intermediate unit B embodies a laminated annular core 14 mounted between front and rear end plates 15 and 16 respectively. Extending thru the laminations of the annular core 14 are a suitable number of clamping rods 17 the ends of which project thru the end plates 15 and 16 and receive at their forward ends suitable clamping nuts, while the rear ends of the rods have their threaded extensions threaded into sockets formed in an annular male clutch member 18. The annular clutch member 18 is therefore rigidly mounted for rotation with the intermediate unit B, and as will be observed in Figures 1 and 5 the annular clutch member 18 is formed with a V-shaped clutching surface. The rear end plate 16 which as will be observed is spaced from the rear end of the armature A, is mounted in a roller bearing 19 having its inner race member engaging the shaft D with a sliding fit permitting sliding movement of the intermediate unit B axially along the shaft D. The front or forward end plate 15 is mounted in a suitable anti-friction bearing 20 having its inner race member slidably fitting about a sleeve 21 keyed to the shaft D forwardly of the commutator 10. The sleeve 21 is provided at its forward end with an anti-friction thrust bearing 22 against which one end of a coil spring 23 encircling the sleeve 21 abuts, with the opposite end of the spring engaging the bearing 20 whereby the spring acts to normally urge the intermediate unit rearwardly on the shaft D. Thus the intermediate unit B is mounted for rotation upon the shaft D and having axial movement therealong, with the annular core 14 concentric to and encircling the core 5 of the inner unit A.

The annular core 14 of the intermediate unit B is provided with inner and outer windings 24 and 25 respectively, the inner winding 24 forming a field winding for the armature A and the outer winding 25 being of the three phase type.

Mounted in the rear end plate 16 are three contact brushes 26, 27 and 28 for independent engagement one with each of the three slip rings 11 mounted upon the rear end of the inner unit or armature A. These contact brushes 26, 27 and 28 may be mounted in insulating blocks 29 and are connected by leads 30 to the three phase winding on the outer side of the annular core 14. As will be observed in Figure 5 the brush 26 engages the innermost contact ring 11, the brush 27 engages the intermediate slip ring, while the brush 28 engages the outermost slip ring.

The brushes 26, 27 and 28 as will be seen by observing Figure 1 are normally out of contact with the slip rings 11.

Mounted in suitable brackets carried by the front end plate 15 of the intermediate member are brushes 31 bearing upon the commutator 10. The end plate 15 is provided at its outer side with an insulating ring 32 upon which is mounted three contact members 34, 35 and 36. The contact members 34, 35 and 36 are extensible as shown in detail in Figure 8.

Figure 4:
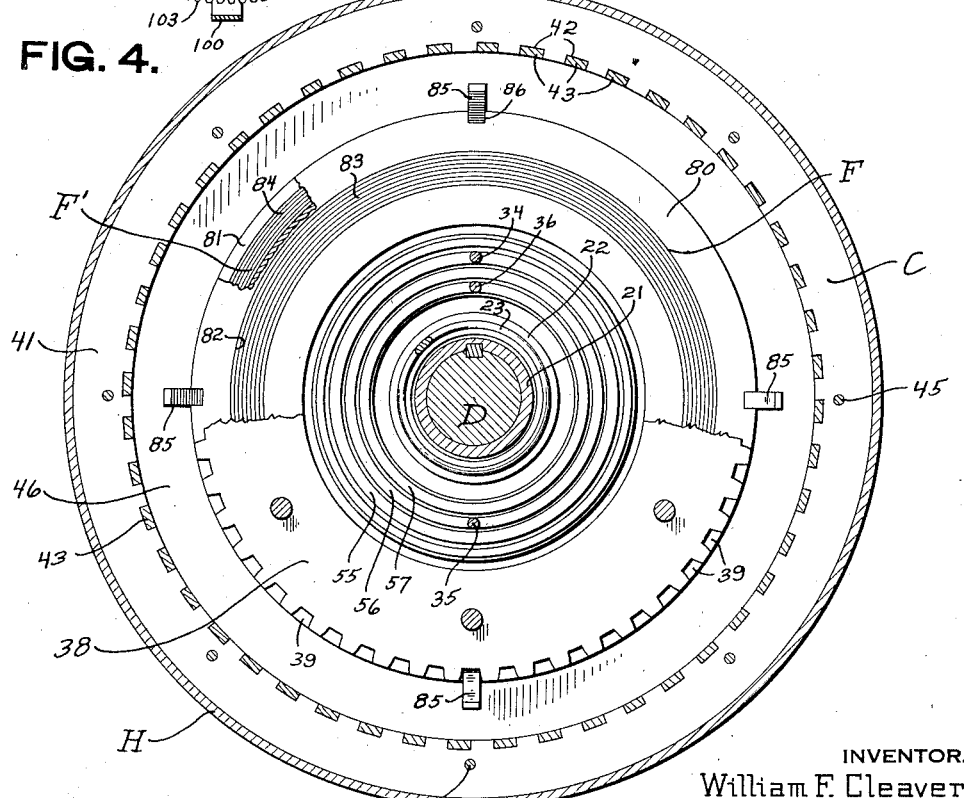
Figure 4 is a section taken substantially on the line 4—4 of Figure 1.

Also mounted upon the front end plate 15 to project slightly forward therefrom is an annular keeper plate or ring 38 provided in its circumferential edge with notches 39 arranged in a circle concentric to the axis of the shaft D. The object and purpose of this keeper plate or ring 38 will be subsequently set forth. As will be observed in Figures 1 and 4 the keeper ring 38 is arranged outwardly of the contact members 34 to 36.

The outer unit C for rotation about the units A and B includes a short circuited squirrel cage rotor 40 embodying a laminated ring 41 provided on its inner side with suitable slots 42 within which are arranged inductors 43 short circuited at their ends by copper rings 44. Extending thru the laminations of the ring 41 are a suitable number of clamping bolts 45, the end portions of which extend thru the rings 44 and thru front and rear end shields 46 and 47 respectively whereby the squirrel cage rotor is securely mounted between the supporting end shields. The front end shield 46 is mounted upon the shaft D upon a suitable anti-friction bearing 48, while the rear end shield 47 is mounted upon the shaft D as by a suitable anti-friction bearing 49. As will be observed in Figure 1, the end shield 46 is mounted upon the shaft D forwardly of the sleeve 21, while the rear end shield 47 is mounted upon the shaft in spaced relation rearwardly of the end plate 16 of the intermediate member B.

The outer unit C may include a frame H in which the shields 46 and 47 may be included, and which frame is provided with an extension 50 at its rear end rearwardly of the end shield 47. The frame H may form a cover for the laminated ring 41 and have the front end shield 46 removable as shown in Figure 1.

Rigidly mounted on the forward side of the rear end shield 47 is an annular female clutch member 51 having a V-shaped groove in its forward edge within which the annular clutch member 18 seats when the intermediate unit B is urged rearwardly by the spring 23. These co-acting annular clutch members 18 and 51 form a releasable mechanical connection between the intermediate and outer units B and C respectively. It may here be well to state that the inner race members of the bearings 48 and 49 are rigid upon the shaft D for retaining the outer unit C against movement axially of the shaft. By observing Figure 1 it will be seen that when the clutch members 18 and 51 are in engagement that the contact brushes 26, 27 and 28 are out of electrical contact with the slip rings 11. An air gap is of course provided between the inner and intermediate units and also between the intermediate and outer units for allowing free relative rotation of the units one with respect to the other.

Insulatively mounted upon the inner side of the front end shield 46 as upon an insulating ring 52 is a series of three concentrically arranged contact rings 55, 56 and 57 which are respectively engaged by the contact members 34, 35 and 36. In Figures 1 and 8 it will be seen that the extensible contact members 34, 35 and 36 are at all times in rubbing contact with their respective contact rings, when the intermediate unit is in clutching relation with the outer unit C.

The frame extension 50 which preferably forms an integral part of the frame H is provided at its rear end with an inturned coupling or ring flange 58 providing a circular opening 58' of a diameter substantially greater than the diameter of the shaft D.

The coupling member E' for mounting upon the rear end portion of the shaft D embodies a hub portion 59 within which the shaft D is freely rotatable, and a coupling flange 60 which may be connected to the propeller shaft or any other shaft intended to be rotated. The coupling member E' is mounted against longitudinal movement along the shaft D, and at a point intermediate the ends of the hub 59 is an annular flange 61 arranged in alignment with the ring flange 58. Connecting the flange 61 with the ring flange 58 is a series of radially extending coil springs 62 forming a yieldable drive coupling between the outer unit C and the coupling member E'. A shield 63 may be provided for enclosing the springs 62 and covering the opening 58'. The forward end of the coupling member E' is provided with a ratchet flange 64 provided in its front edge with a series of cam projections 65 for cooperating and co-acting with the torque controlled thrust means E for automatically freeing mechanical coupling between the intermediate unit B and the outer unit C.

The means E embodies a thrust member or plate 66 carrying a series of radially arranged rollers 67 one of which is provided for each of the cam projections 65 of the ratchet flange 64. The circumference of the thrust plate 66 is slotted providing teeth 68 which interfit with teeth 69 formed internally of an annular guide ring 70 supported inwardly of the frame extension 50 between the flange 58 and end shield 47. The guide ring 70 may be supported by suitable arms 71. This guide ring 70 so mounts the thrust plate 66 as to allow movement thereof axially along the shaft D and preventing circumferential movement of the thrust plate with respect to the outer unit C. Arranged forwardly of the thrust plate 66 is a collar 72 provided with thrust pins 73 which are guided thru the ball bearing mounting 49 for engagement with the ball thrust collar 74 having engagement with the ball bearing mounting 19.

When the turning strain upon the gear is raised above a certain point, the yieldable spring coupling between the outer unit C and the coupling member E' causes the coupling flange 58 to so advance in front of the coupling member as to distort the springs 62 in a direction circumferentially of the coupling member, and so cause the thrust plate 66 to be acted upon by the ratchet flange 64 as to force the thrust plate forwardly along the shaft D so that the thrust pins 73 will engage the collar 74 and shift the intermediate unit B along the shaft D against the action of the spring 23.

Referring now to the electromagnetic means F for electrically liberating the intermediate and outer units to allow relative rotation of the units, the same embodies a steel ring 80 mounted inwardly of the front end shield 46 in confronting relation to the keeper plate or ring 38. The ring 80 is provided in its rear face with a slot 82 in which is wound an energizing coil 83 forming substantially a "pull over" ring magnet for the intermediate unit B. When a magnetic flux is set up by the coil 83 the keeper plate 38 is drawn over against the pressure of the spring 23 and disengages the clutch members 18 and 51, and this movement of the intermediate unit B also moves the brushes 26, 27 and 28 into engagement with the slip rings 11.

The locking means F' which is also built into the steel ring 80, embodies an energizing coil 84 wound in a slot 81 formed in the circumferential face of the ring 80. This coil 84 acts as a locking coil for actuating a suitable number of locking levers 85 pivotally mounted in the circumference of the ring 80 and fitting in transverse slots 86. Suitable springs 87 may act upon the levers 85 for normally holding the levers out of engagement with the keeper plate 38. The ring 80 is of a diameter equal to the diameter of the keeper plate 38 and when the coil 84 is energized the levers 85 are swung inwardly so that their ends engage in the notches 39 of the plate 38 whereby the intermediate and outer units B and C are mechanically coupled. The coils 83 and 84 each set up a separate magnetic flux when a current is delivered to the coils.

Insulatively mounted upon the outer side of the end shield 46 is a set of fixed collector rings 90, 91, 92, 93, 94 and 95 which are respectively engaged with a wiping contact by brushes $a$, $b$, $c$, $d$, $e$ and $f$ suitably mounted upon a fixed brush bar 96.

A magnetically operated keeper R is provided for holding engagement with the outer unit C during starting of the engine, and this keeper unit R embodies a lever 100 pivotally mounted intermediate its ends upon a suitable fixed support 101. One end of the lever 100 is provided with a toothed segment 102 for engaging in an annular series of teeth 103 provided about the rear end of the frame H. The opposite end of the lever 100 acts as an armature to be attracted by an electro-magnet 104 whereby the segment 102 is swung into engagement with the teeth 103. A suitable spring 105 may act upon the lever 100 for disengaging the segment 102 when the magnet is deenergized.

Figure 14:
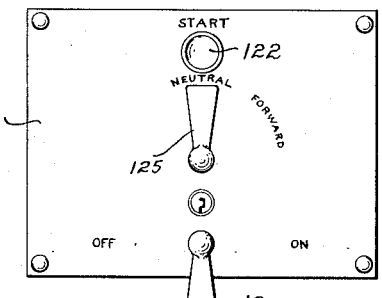
Figure 14 shows by way of example one type of switch plate having switches mounted thereon for controlling the electromagnetic gear.
Figure 13:
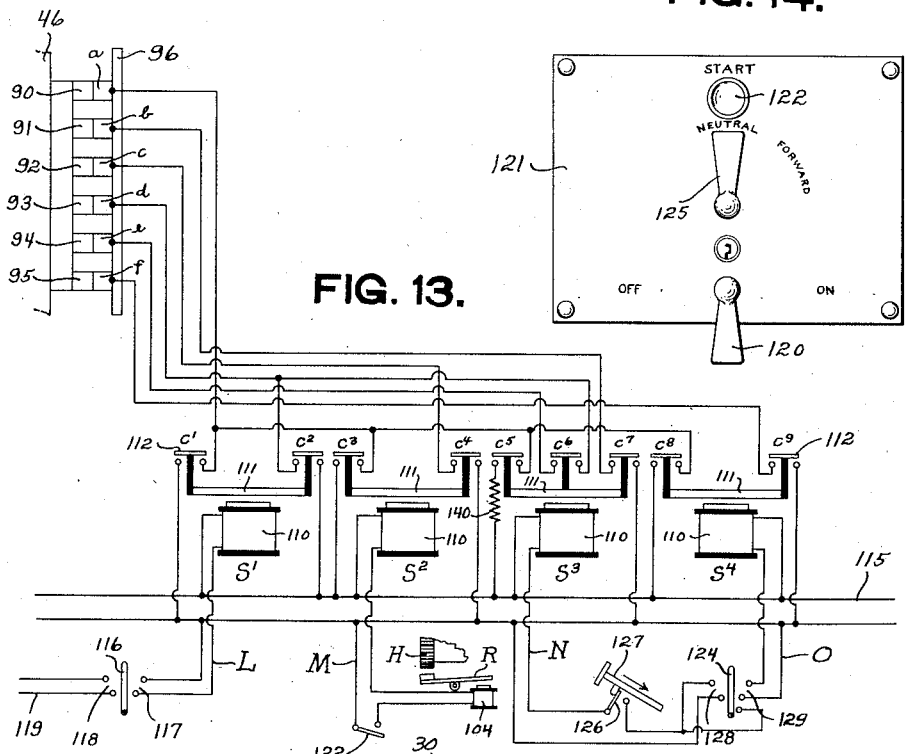
Figure 13 is a wiring diagram showing the manner of controlling the magnetically operated switches controlling the circuit to the magnetic gear.

Referring now to Figures 13 and 14 and particularly to Figure 13 showing the circuit arrangement for controlling the magnetic gear, four control circuits L, M, N and O are provided for operating magnetic switches.

$S^1$, $S^2$, $S^3$ and $S^4$ respectively which control electric circuits to the six collector rings 90 to 95 inclusive. Each magnetic switch includes a winding 110 and an armature 111 actuated by the windings when energized for operating contact members 112.

The control circuit L acts to close contacts $c^1$ and $c^2$; the control circuit M acts to close contacts $c^3$ and $c^4$; the control circuit N acts to close contacts $c^5$, $c^6$ and $c^7$; and the control circuit O acts to close contacts $c^8$ and $c^9$. The main circuit connected with the collector rings 90 to 95 inclusive, and the control circuits L, M, N and O are connected in a supply circuit 115 which in the case of the automobile is connected with the storage battery.

The control circuit L is provided with a change over switch 116 which when bridging the contacts 117 closes the circuit to the relay 110 of the switch $S^1$ and when swung to bridge the contacts 118 acts as an ignition switch for the ignition circuit 119. The switch 116 may be operated by a switch lever 120 mounted in the switch panel 121 shown in Figure 14.

The control circuit M forming the starting circuit, is provided with a starting switch button 122 which when closed energizes the relay of the switch $S^2$ for closing contacts $c^3$ and $c^4$. The electromagnet 104 of the keeper means R is connected in the control circuit M and is energized for operating the lever 100 when the starting button is pressed.

A change over running switch 124, operable by a switch lever 125 is provided for selectively controlling the circuits N and O. Connected in the control circuit N is a second switch 126 which is connected for operation by the accelerator pedal 127 when the pedal is moved in the direction of the arrow for accelerating the engine. Thus it will be seen that the switch 124 must be in a forward or running position bridging the two contacts 128, and the switch 126 closed for energizing the relay of the magnetic switch $S^3$.

When the switch 124 is moved to a reverse position bridging the three contacts 129 the magnetic switches $S^3$ and $S^4$ will be energized and so control circuits to the magnetic gear as to liberate the units B and C by the electromagnetic means F.

The inner member or armature A is in the case of the automobile, connected directly to the crank shaft by the coupling flange 12 so that the armature serves as a fly wheel while the coupling member E' is connected directly to the propeller shaft so that driving power to the shaft is transmitted magnetically thru the air gap of the magnetic gear. The intermediate unit B as will be observed is part of the time connected to the outer unit C by clutch members 18 and 51, and part of the time mechanically free from the outer unit and its movement and position is automatically governed by the magnetic reaction of the inner and outer units A and C respectively.

Referring now to the specific mode of operation of the magnetic gear, and beginning with the gear functioning as a starter for the engine, when the starting button 122 is pressed the magnetic switch $S^2$ is operated for closing the contact $c^3$ and $c^4$. Closing of contacts $c^3$ and $c^4$ allows current to pass from the line 115 thru armature winding 8 and field winding 24 on the inside of the intermediate unit B and locking coil 84 connected in series with the series connected armature and field coils 8 and 24 respectively. Energizing of the locking coil 84 closes the locking levers 85 so that the levers engage with the keeper plate 38 and mechanically connect the intermediate and outer units. Closing of the starting switch 122 also energizes the magnet 104 which operates the lever 100 and engages the segment 102 to teeth 103 whereby the outer unit is held against rotation during the operation of starting the engine. When the inner unit or armature A, which is directly connected to the engine crank shaft, receives a current by closing the switch 122 the device functions as an ordinary D. C. series motor and produces a torque sufficient to crank the engine. Upon opening the switch 122 the contacts $c^3$ and $c^4$ open and leave the engine running under its own power. Opening of the switch 122 also opens the circuit to the locking coil 84 and the magnet of the keeper means R. The armature A will now revolve with the crank shaft, and so long as the running switch 124 is in a central position the armature will have no effect upon the units B and C so that no power will be transmitted to the coupling member E'. Altho the armature A is revolving within the units B and C, there is no magnetic influence from the intermediate unit B and by pressing the accelerator pedal 127 the engine can be accelerated to any speed without propelling the vehicle, even though the switch 126 is closed upon pressing the accelerator pedal.

After the engine has started the switch lever 125 is swung to forward or running position moving the switch arm 124 into a position for bridging the contacts 128 in the control circuit N. With the running switch 124 bridging the contacts 128 the control circuit N will be closed except for the contact switch 126 operable by the accelerator pedal 127, and this switch 126 is open when the accelerator pedal is in its normal position as shown in Figure 13. Now upon pressing the accelerator pedal for closing the switch 126 the relay in the control circuit $S^3$ will be energized for closing contacts $c^5$, $c^6$ and $c^7$, placing the field coils 24 on the inner side of the intermediate member B in shunt circuit with the armature winding 8 and at the same time connecting the negative and positive brushes 31 across the line 115 thru a small resistance 140 in Figure 13. With the gear in this condition the power from the engine is transmitted magnetically between the armature or inner member A and intermediate unit B thru the air gap between the units A and B for rotating the coupling member E' and propel the vehicle, and at the same time supply a current to charge the battery thru the resistance 140. In this driving position of the gear it will be noted that the intermediate and outer units are mechanically coupled by the clutch members 18 and 51 and the device now acts as a magnetic clutch providing itself with current to produce a magnetic influence by a small percentage of slip between the speed of the inner and intermediate units A and B respectively. The winding 24 on the inner side of the intermediate member under this condition of the gear is connected directly across the armature, and the winding is so designed that very little difference of speed will produce sufficient E. M. F. to provide the necessary flux.

It will be seen that when the power is being transmitted magnetically between the units A and B, that the outside rotor or stator winding 25 on the outside of the intermediate unit B is inactive as the winding is electrically disconnected at the brushes 26, 27 and 28 with the slip rings 11. The brushes 26, 27 and 28 are held out of engagement with the slip rings 11 by a spring 23 acting to normally force the intermediate unit along the shaft D.

So long as the vehicle is traveling on a level road or downgrade, and the speed of the engine is raised gradually, the magnetic clutch formed between the inner and intermediate units will transmit all of the power required to start and propel the vehicle. On the other hand, should the engine be accelerated quickly, or should the vehicle be traveling upgrade, there would be likelihood of stalling the engine if means were not provided for utilizing the power of the engine, and it is under these conditions where the three phase outer winding 25 of the intermediate unit and the field of the outer unit come into action.

As soon as the torque or turning strain necessary to propel or start the vehicle exceeds a certain point, or at the moment of tangential effort between the unit C and coupling member E', the intermediate and outer units B and C respectively will be instantly liberated by disengaging the clutch members 18 and 51. This turning strain causes the assembly of radial coil springs 62 to be distorted in a direction circumferentially of the gear and so acts upon the torque controlled thrust means E for forcing the intermediate member longitudinally of the shaft D against action of the spring 23. As soon as this thrust movement of the intermediate member occurs, due to the distortion of the radial springs 62 determined by the amount of torque being transmitted, the functioning of the gear is altered since the units B and C are mechanically free and are under inductive influence only, and the relative movement of these units will be entirely governed by the amount of power being transmitted. The gear or apparatus now actually takes the form of two separate units, the armature and inside winding of the intermediate member acting partly as a magnetic clutch helping to drive the vehicle and partly a generator of three phase A. C. current which is taken from the three slip rings 11 by the brushes 26, 27 and 28 and connected to the three phase winding on the outside of the intermediate member B; while the induced influence of this three phase winding 25 is co-acted upon by the short circuited squirrel cage rotor 40 of the outer unit C so that the three phase current taken from the armature will drive the outer unit much in the same manner as the rotor of an ordinary three phase motor with the speed of the rotor depending entirely upon the amount of power transmitted thru the system. It will of course be understood that when the intermediate unit is shifted thru distortion of the springs 62 that the brushes 26, 27 and 28 contact with the collector rings 11 connected at 120 electrical degrees apart to the armature winding 8.

Figure 10:
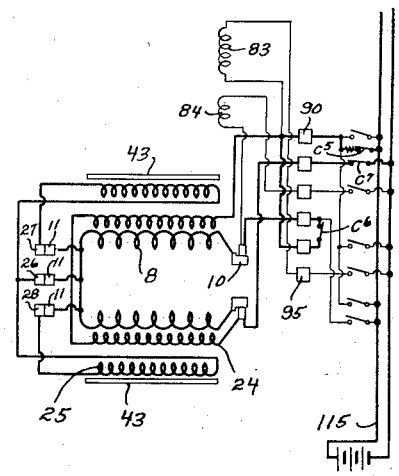
Figure 10 is a wiring diagram showing active parts of the circuit when the torque or turning strain is sufficient to liberate the intermediate and outer members of the gear.

As soon as the torque or turning strain is again reduced to a point where the radial springs 62 are not distorted, and means E will again allow mechanical coupling of the units B and C thru the clutch members 18 and 51 so that the armature or inner unit A will again act as a magnetic clutch. In the wiring diagram shown in Figure 10 the electrical condition of the magnetic gear is shown in a position when the intermediate member has been automatically freed from mechanical coupling with the outer unit thru distortion of the spiral springs 62.

Figure 11:
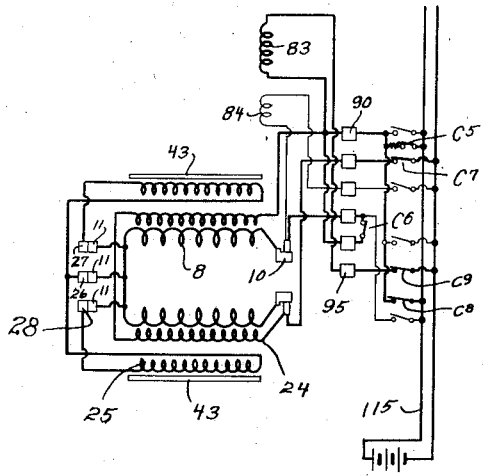
Figure 11 is a wiring diagram illustrating active portions of the circuit when certain switches are closed for freeing the outer and intermediate members by electrical means.

Now defining the functioning of the apparatus for electrically liberating the units B and C by the electro-magnetic means F, the accelerator pedal 127 is released for opening the switch 126 which opens the control circuit N, opening contacts $c^5$, $c^6$ and $c^7$. The electrical condition of the apparatus is illustrated in Figure 11.

After releasing the accelerator pedal the running switch 124 is moved from the forward or running position into the reverse position closing both of the control circuits N and O by bridging the contacts 129. Closing the circuit N energizes the magnet of the switch $S^3$ and closes switches $C^5$, $C^6$ and $C^7$ forming a connection between the field winding 24 and line 115. Closing the control circuit O energizes the magnet of the magnetic switch $S^4$ and closes contacts $c^8$ and $c^9$. Closing of contacts $c^8$ and $c^9$ energizes the "pull over" coil 83. Energizing of the coil 83 acts upon the keeper plate 38 for drawing the intermediate unit B over against pressure of the spring 23, disengaging the clutch members 18 and 51. It will now be seen that the intermediate unit is now mechanically free from the outer unit, not thru the driving force, but by the pull over magnet 83. The current development will now be the same as when the intermediate member is freed thru turning strain.

Figure 12:
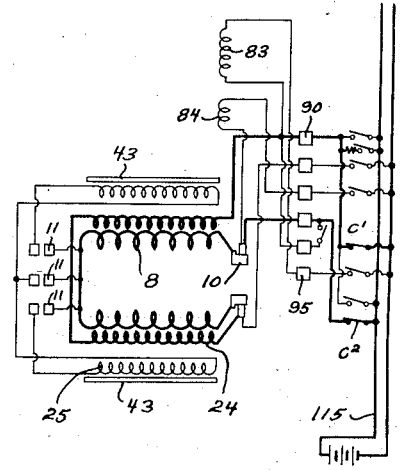
Figure 12 is a wiring diagram illustrating active parts of the circuit when the gear acts as a brake and as a generator.

In applying the electric brake effect as in Figure 12, when the vehicle is coasting with the engine running relatively slow, the intermediate unit will be running in front of the armature or inner unit A. In order to make use of the power being developed by the momentum of the vehicle, the switch 116 is swung to an off position opening the contact 118 and bridging the contact 117 for closing the control circuit L. When the control circuit L is closed contacts $c^1$ and $c^2$ are closed so that the battery connected in the line 115 will be connected to the system to receive the current generated by the effect of the intermediate unit running before the armature or inner unit. Movement of the switch 116 from the contact 118 also disconnects or opens the ignition circuit 119.

From the foregoing it will be apparent that a novel and improved power transmission apparatus has been disclosed which will have especial application as power transmission means for motor vehicles. It will also be apparent that an improved magnetic gear of this character has been provided which will be entirely automatic in its operation and embodying relatively rotatable concentrically arranged units functioning cooperatively one with another as independent units of a motor and a generator.

Changes in detail may be made to the specific form of apparatus herein shown and described, without departing from the spirit of the invention or the scope of the following claims.

I claim:

1. In an electromagnetic gear, a shaft to be driven, an inner armature unit fixed on the shaft, an outer rotor unit freely rotatable on the shaft about the inner unit for connection with the load, an intermediate armature unit freely rotatable on the shaft in coacting relation between the inner and outer units and having releasable mechanical coupling with the outer unit, and means for automatically liberating the intermediate unit when the load exceeds the driving effort.

2. In an electromagnetic gear, a driven shaft, an inner armature unit fixed upon the shaft, an outer rotor unit rotatable on the shaft about the inner unit for connection to the load, an intermediate unit rotatable on the shaft in inductive relation between the inner and outer units and releasably coupled mechanically to the outer unit, and means for freeing the intermediate unit when the turning strain upon the gear exceeds a given point for placing the intermediate and outer units under inductive influence only.

3. In an electromagnetic gear, the combination of a shaft to be driven, an inner unit fixed on the shaft, an outer unit freely rotatable on the shaft about the inner unit, an intermediate unit rotatable on the shaft in inductive relation between the inner and outer units, coupling means normally connecting the intermediate and outer units for rotation together, and torque controlled thrust means for automatically liberating the intermediate unit from the outer unit upon a predetermined turning strain on said shaft.

4. In an electromagnetic gear, the combination of a shaft to be driven, an inner unit fixed on the shaft, an outer unit freely rotatable on the shaft about the inner unit for connection with the load and embodying an end shield, an intermediate unit rotatable on the shaft in inductive relation between the inner and outer units and having movement axially of the shaft, a ring clutch member carried by said end shield, a ring clutch member carried by one end of the intermediate unit for clutching engagement with the clutch member on said end shield, means normally urging the clutch members into clutching engagement for connecting the intermediate unit for rotation with the outer unit, and torque controlled thrust means for shifting the intermediate member axially and parting said clutch members.

5. In an electromagnetic gear, the combination of a shaft to be driven, an inner unit fixed on the shaft, an outer unit rotatable on the shaft about the inner unit for connection with the load, an intermediate unit rotatable on the shaft in inductive relation between the inner and outer units and having axial movement along the shaft, clutch means between one end of the intermediate unit and the outer unit, spring means normally retaining the clutch means in clutching engagement, and torque controlled thrust means acting to shift the intermediate unit axially against the action of said spring means for allowing relative rotation of the intermediate and outer units.

6. In an electromagnetic gear, the combination of a shaft to be driven, an inner unit fixed on the shaft, an outer unit rotatable on the shaft about the inner unit, an intermediate unit rotatable on the shaft in inductive relation between the inner and outer units and having movement axially along the shaft, normally engaging clutch means between the intermediate and outer units, torque controlled thrust means including a coupling member rotatable on the shaft and held against movement axially therealong and thrust means operable by the coupling member for parting the clutch means between the intermediate and outer units, and circumferentially yieldable coupling means between the outer unit and said coupling member.

7. In an electromagnetic gear, the combination of a shaft to be driven, an inner unit fixed on the shaft, an outer unit rotatable on the shaft about the inner unit, an intermediate unit rotatable on the shaft in inductive relation between the inner and outer units and having movement axially on the shaft, releasable mechanical coupling means between the intermediate and outer units, a coupling member for connection with the load, rotatable on the shaft and held against axial movement therealong and embodying a ratchet flange, circumferentially yieldable coupling means between the outer unit and said coupling member, and means movable axially along the shaft by said ratchet flange for parting the intermediate and outer units when said yieldable coupling means is distorted circumferentially of the coupling member.

8. In an electromagnetic gear, the combination of a shaft to be driven, an inner unit fixed on the shaft, an outer unit rotatable on the shaft about the inner unit and embodying a frame extension at one end thereof, an intermediate unit rotatable on the shaft in inductive relation between the inner and outer units, clutch engaging means between one end of the intermediate unit and the outer unit, a coupling member for connection with the load rotatable on the shaft and held against longitudinal movement therealong, and embodying a ratchet flange, radially arranged springs connecting the coupling member with said frame extension, a thrust plate mounted in the frame extension for rotation therewith and movable longitudinally of the shaft by said ratchet flange, and thrust pins movable by the thrust plate for parting the clutch means between the intermediate and outer units when said springs are distorted in a direction circumferentially of the shaft.

9. In an electromagnetic gear, the combination of a shaft to be driven, an inner unit fixed on the shaft, an outer unit rotatable on the shaft about the inner unit including a frame extension ring flange and a guide ring, an intermediate unit rotatable on the shaft in inductive relation between the inner and outer units, co-acting annular clutch members carried by the intermediate and outer units, said intermediate unit having axial movement along the shaft, spring means normally engaging the clutch members and connecting the intermediate unit for rotation with the outer unit, a coupling member for connection to the load, rotatable on the shaft and held against movement axially therealong and embodying a ratchet flange, radially arranged springs connecting the ring flange and coupling member, a thrust plate mounted against rotation in the guide ring for movement axially along the shaft and having a nest of radially arranged rollers engageable by said ratchet flange, and a collar provided with thrust pins movable axially along the shaft by the thrust plate to move the intermediate unit axially along the shaft and part said clutch members to allow relative rotation of the intermediate and outer units.

10. In an electromagnetic gear, the combination of a shaft to be driven, an inner unit fixed on the shaft, an outer unit rotatable on the shaft for connection with the load, an intermediate unit rotatable on the shaft in inductive relation between the inner and outer unit and having movement axially along the shaft, clutch means at one end of the intermediate unit connecting the intermediate unit to the outer unit, spring means normally maintaining the clutch means active, and electromagnetic means for moving the intermeliate unit axially along the shaft and parting said clutch means to allow relative rotation of the intermediate and outer units.

11. In an electromagnetic gear, the combination of a shaft, an inner unit fixed on the shaft, an outer unit rotatable on the shaft embodying front and rear end shields, an intermediate unit rotatable on the shaft in inductive relation to the inner and outer units and including front and rear end plates, said intermediate unit having limited movement axially of the shaft, annular co-acting clutch members carried by the rear end shield and rear end plate, means normally urging the intermediate unit axially for clutching relation with the outer unit, an annular keeper plate mounted on said front end plate, an annular magnet core mounted on said front end shield in confronting relation to said keeper plate and having an annular groove provided in its rear face, and a winding in said groove which when energized co-acts with the magnet core for attracting the keeper plate and parting said clutch members to allow relative rotation of the outer and intermediate units.

12. In an electromagnetic gear, the combination of a shaft to be driven, an inner unit fixed on the shaft, an outer unit for connection to the load, rotatable on the shaft about the inner unit, an intermediate unit rotatable on the shaft in inductive relation between the inner and outer units, a notched keeper plate carried by one end of the intermediate unit, and electro-magnetic locking means carried by the outer unit and embodying locking levers engageable with the notched keeper plate for connecting the intermediate unit against relative rotation with respect to the outer unit.

13. In an electromagnetic gear embodying inner, outer and intermediate inductively related units having relative rotation about a common axis, electromagnetically operable locking means for mechanically connecting the intermediate and outer units when the inner unit co-acts with the intermediate unit as a starting motor.

14. In an electromagnetic gear, the combination of a shaft to be driven, an inner unit fixed on the shaft, and outer unit rotatable on the shaft about the inner unit for connection to the load and embodying an end shield, an intermediate unit rotatable on the shaft in inductive relation between the inner and outer units and embodying an end plate confronting said end shield, an annular keeper plate carried by the end plate and having notches in its circumferential edge, an annular core carried by said end shield and having an annular groove in its circumferential face, an energizing coil in said groove, and locking levers pivotally carried by said core and movable into the notches of said keeper plate when said coil is energized for connecting the intermediate unit against relative rotation with respect to the outer unit.

15. In an electromagnetic gear, the combination of a shaft to be driven, an inner unit fixed on the shaft, an outer unit rotatable on the shaft about the inner unit for connection to the load, an intermediate unit rotatable on the shaft in inductive relation between the inner and outer unit, electromagnetically operated locking means for connecting the intermediate and outer units against relative rotation, and magnetically operated keeper means for holding the outer unit against rotation when the inner and intermediate units co-act as a motor.

16. In an electromagnetic gear, the combination of a shaft to be driven, an armature fixed on the shaft embodying a commutator and slip rings connected at equi-distant points on the armature winding, an outer unit rotatable on the shaft about the armature embodying a rotor, an intermediate unit rotatable on the shaft between the outer unit and armature and movable axially along the shaft, said intermediate unit including an annular core having inner windings co-acting with the armature and outer windings co-acting with said rotor, brushes carried by said intermediate unit for engagement with said slip rings and connected with the outer windings of the intermediate unit, and torque controlled thrust means for shifting the intermediate unit and said brushes into engagement with the slip rings.

17. In an electromagnetic gear, the combination of a shaft for connection with the driving power, an armature fixed on the shaft having a commutator at one end and three slip rings at its opposite end connected with the armature winding at 120 electrical degrees apart, an outer unit rotatable on the shaft about the armature for connection with the load and including a rotor portion, an intermediate unit rotatable on the shaft between the armature and outer unit including an annular core having an inner winding co-acting with the armature and an outer winding co-acting with said rotor portion, clutch means normally connecting the intermediate and outer units, three contact brushes carried by the intermediate unit and connected with the outer winding thereof for engagement with said slip rings and normally spaced therefrom, and torque controlled thrust means for liberating the intermediate unit from the outer unit and engaging said contact brushes with the slip rings.

18. In an electromagnetic gear, the combination of a shaft for connection with the driving power, an armature fixed on the shaft having a commutator at one end and three slip rings at its opposite end connected with the armature winding at 120 electrical degrees apart, an outer unit rotatable on the shaft about the armature for connection with the load and including a rotor portion, an intermediate unit rotatable on the shaft between the armature and outer unit including an annular core having an inner winding co-acting with the armature and an outer winding co-acting with said rotor portion, clutch means normally connecting the intermediate and outer units, three contact brushes carried by the intermediate unit and connected with the outer winding thereof for engagement with said slip rings and normally spaced therefrom, and electromagnetically operated means for liberating the intermediate and outer units and moving said contact brushes into engagement with said slip rings.

19. In an electromagnetic gear, the combination of a shaft for connection with the driving power, an armature fixed on the shaft provided with a commutator and three slip rings connected to equidistant points on the armature winding, an outer unit rotatable on the shaft about the armature for connection with the load and formed with a squirrel cage rotor; an intermediate unit rotatable on the shaft between the armature and outer unit and having movement axially along the shaft, said intermediate unit embodying an annular core having an inner winding for co-acting with the armature and an outer three phase winding co-acted upon by said squirrel cage rotor, a contact brush carried by the intermediate unit for each slip ring and connected with said three phase winding, said contact brushes being normally out of engagement with the slip rings, clutch means normally connecting the intermediate unit for rotation with the outer unit, and torque controlled thrust means acting to part said clutch means and move the contact brushes into engagement with their respective slip rings.

20. In an electromagnetic gear the combination of a shaft for connection with the driving power, an armature fixed on the shaft provided with a commutator and three slip rings connected to equidistant points on the armature winding, an outer unit rotatable on the shaft about the armature for connection with the load and formed with a squirrel cage rotor, an intermediate unit rotatable on the shaft between the armature and outer unit and having movement axially along the shaft, said intermediate unit embodying an annular core having an inner winding for co-acting with the armature and an outer three phase winding co-acted upon by said squirrel cage rotor, clutch means normally connecting the intermediate unit for rotation with the outer unit, a contact brush carried by the intermediate unit one for each of the three slip rings for connection to the three phase winding and normally out of contact with the slip rings, and electromagnetic means for disconnecting the intermediate unit from clutching engagement with the outer unit.

21. In electric transmission apparatus for motor vehicles, the combination of a magnetic gear including a gear shaft for direct connection with the crank shaft of the vehicle engine, an inner unit fixed upon the gear shaft, an outer unit rotatable on the gear shaft about the inner unit, an intermediate unit rotatable on the gear shaft in inductive relation between the inner and outer units, clutch means normally connecting the intermediate and outer units, a coupling member rotatable on the gear shaft for connection with the drive shaft of the vehicle, a circumferentially yieldable coupling between the coupling member and said outer unit, and electromagnetic means for parting said clutch means and allowing said units to co-act magnetically with one another for imparting rotation to the coupling member.

22. In electric transmission apparatus for motor vehicles, the combination with a magnetic gear including a gear shaft for direct connection with the crank shaft of the vehicle engine, an inner unit fixed upon the gear shaft, an outer unit rotatable on the gear shaft about the inner unit, an intermediate unit rotatable on the gear shaft in inductive relation between the inner and outer units, and a coupling unit rotatable on the gear shaft with the outer unit for connection with the drive shaft of the vehicle; of magnetically operable locking means for preventing rotation of the outer and the intermediate units when the inner unit co-acts with the intermediate unit to impart rotation to the gear shaft for cranking the engine.

23. In electric transmission apparatus for motor vehicles, the combination with a magnetic gear including a gear shaft for direct connection with the engine crank shaft, an armature fixed upon the gear shaft, an outer unit rotatable on the gear shaft about the inner unit for connection with the drive shaft of the vehicle, and an intermediate unit rotatable on the gear shaft between the armature and the outer unit and having inner and outer windings co-acting respectively with the armature and the outer unit; of a magnetically operated control circuit connecting the armature in shunt with the inner winding on said intermediate unit, and independent circuit closing switches in the control circuit with one of said switches closed by movement of the acceleration pedal for the vehicle engine.

24. In electric transmission apparatus for motor vehicles having an electrical system including a battery, the combination with a magnetic gear including a gear shaft for direct connection with the engine crank shaft, an armature fixed upon the gear shaft, and a unit rotatable on the gear shaft about the armature for connection with the drive shaft of the vehicle and having an inner winding co-acting with the armature; of a magnetically operated control circuit for connecting the armature and the inner winding of said unit in series and across the terminals of the battery for the electrical system, and a control switch for opening the ignition circuit of the engine and closing the magnetic control circuit when the vehicle is coasting with the said unit running in front of the armature.

WILLIAM FREDERIC CLEAVER.